US008047757B1

(12) United States Patent
Wood

(10) Patent No.: US 8,047,757 B1
(45) Date of Patent: Nov. 1, 2011

(54) GRAIN CART HAVING A SINGLE AUGER DISCHARGE CONVEYOR

(75) Inventor: James E. Wood, Ft. Recovery, OH (US)

(73) Assignee: J. & M. Manufacturing Co., Inc., Ft. Recovery, OH (US)

( * ) Notice: Subject to any disclaimer, the term of this patent is extended or adjusted under 35 U.S.C. 154(b) by 586 days.

(21) Appl. No.: 12/074,956

(22) Filed: Mar. 7, 2008

(51) Int. Cl.
*B65G 33/32* (2006.01)
(52) U.S. Cl. ........................ 414/523; 198/668
(58) Field of Classification Search ................. 414/523, 414/526; 198/317, 318
See application file for complete search history.

(56) References Cited

U.S. PATENT DOCUMENTS

| | | | |
|---|---|---|---|
| 4,846,621 A | | 7/1989 | Warsaw |
| 5,100,281 A | * | 3/1992 | Grieshop ..................... 414/526 |
| 5,340,265 A | | 8/1994 | Grieshop |
| 5,655,872 A | | 8/1997 | Plotkin |
| 6,296,435 B1 | | 10/2001 | Wood et al. |
| 6,497,546 B2 | | 12/2002 | Wood et al. |
| 6,776,569 B1 | | 8/2004 | McMahon et al. |
| 7,134,830 B2 | | 11/2006 | Wood |
| 7,350,872 B2 | * | 4/2008 | Wood ............................ 298/18 |
| 7,494,409 B2 | * | 2/2009 | Voss et al. ..................... 460/114 |
| 7,543,365 B2 | * | 6/2009 | Van Mill et al. ............. 29/407.02 |
| 2004/0184905 A1 | * | 9/2004 | Kinzenbaw et al. ........... 414/526 |
| 2010/0209223 A1 | * | 8/2010 | Van Mill et al. ............... 414/526 |

OTHER PUBLICATIONS

2006 Brent 1084 Grain Handling and Storage, FASTLINE, page visited Sep. 1, 2010.*
Brent Avalanche 94 Series Grain Cart, 2007, Unverferth Manufacturing Company.*
Unverferth Manufacturing Company, Inc., BRENT Avalanche Grain Cart, 1999, p. 3, USA.

* cited by examiner

*Primary Examiner* — Joshua Rudawitz
(74) *Attorney, Agent, or Firm* — Jacox, Meckstroth & Jenkins

(57) ABSTRACT

A grain cart has a wheel supported frame on which is mounted an open top container having inclined bottom walls and including a single discharge auger conveyor having a lower section extending from a sump for the container adjacent a front left inclined corner portion of the container. The auger conveyor has an extended upper section supported by a hinge assembly having a pivot axis offset and askewed at an acute angle from the auger axis. The hinge assembly provides for pivoting the upper conveyor section between an inclined grain discharge position projecting upwardly, laterally outwardly and forwardly from the container and a stored position inclined downwardly at a substantial angle from the hinge assembly in front of the container. In the stored position, the grain discharge outlet is located lower than the top surfaces of the wheels and does not project laterally beyond the right side wall of the container.

3 Claims, 4 Drawing Sheets

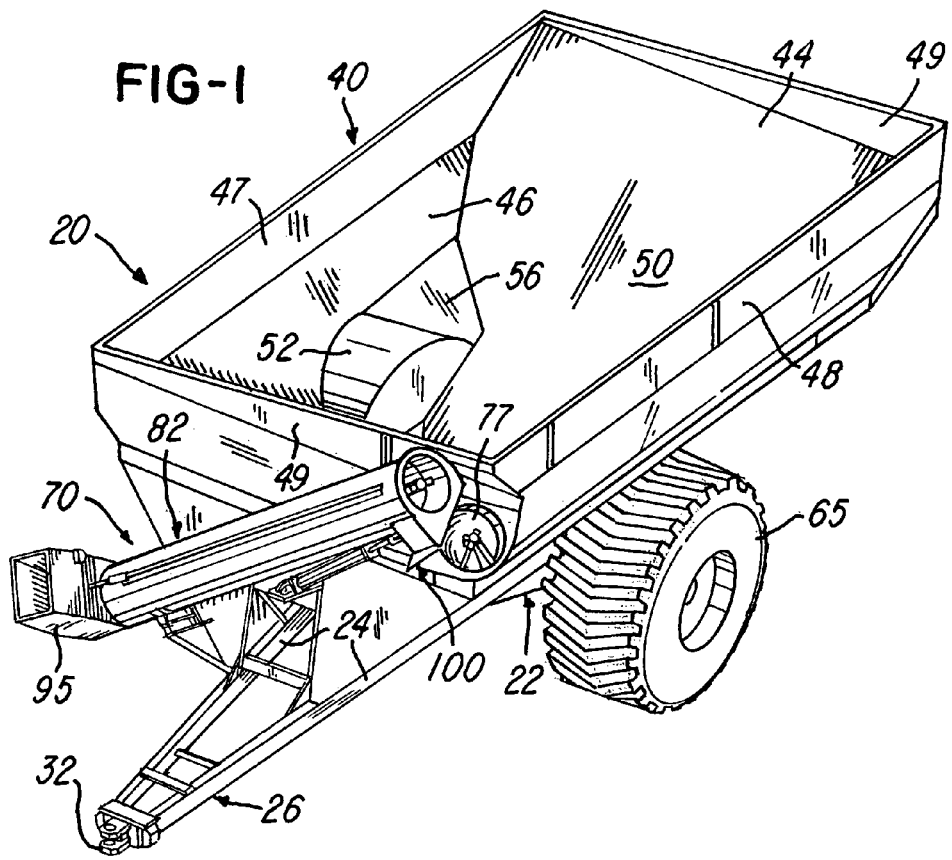
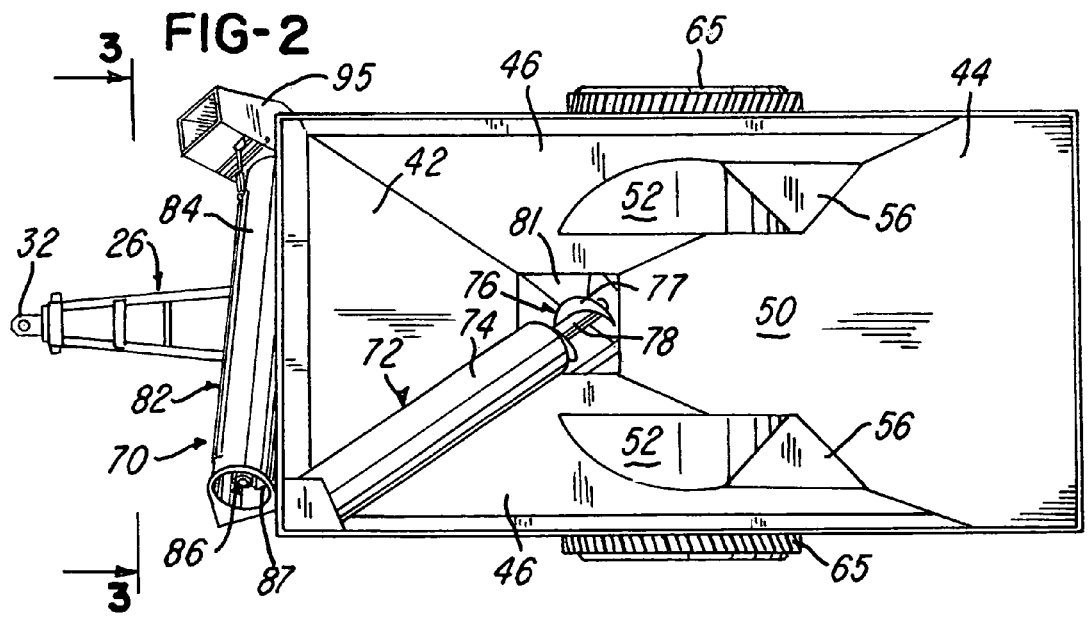

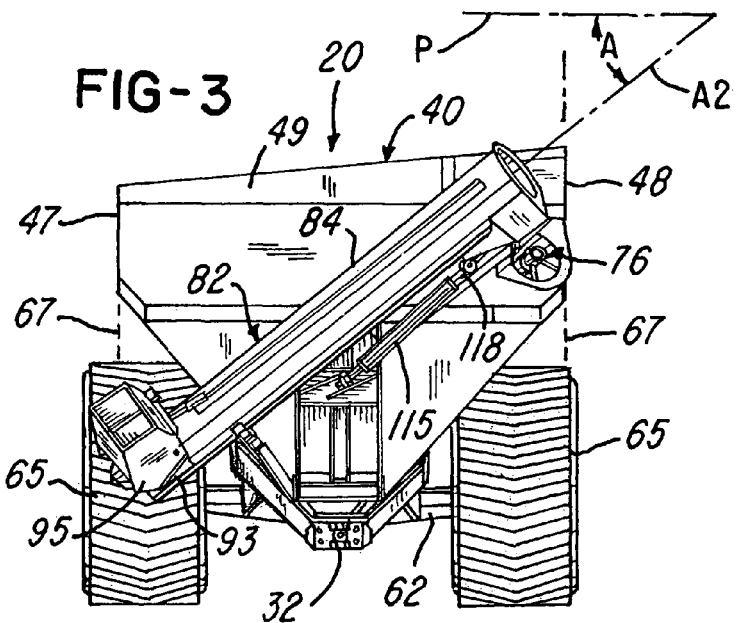
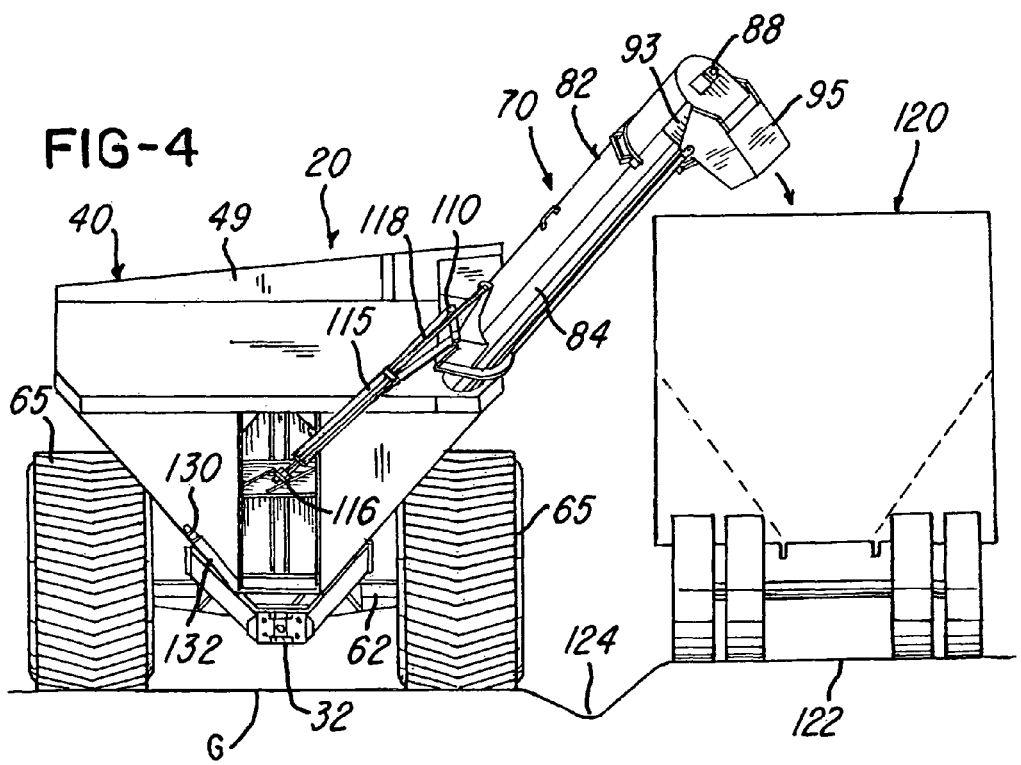

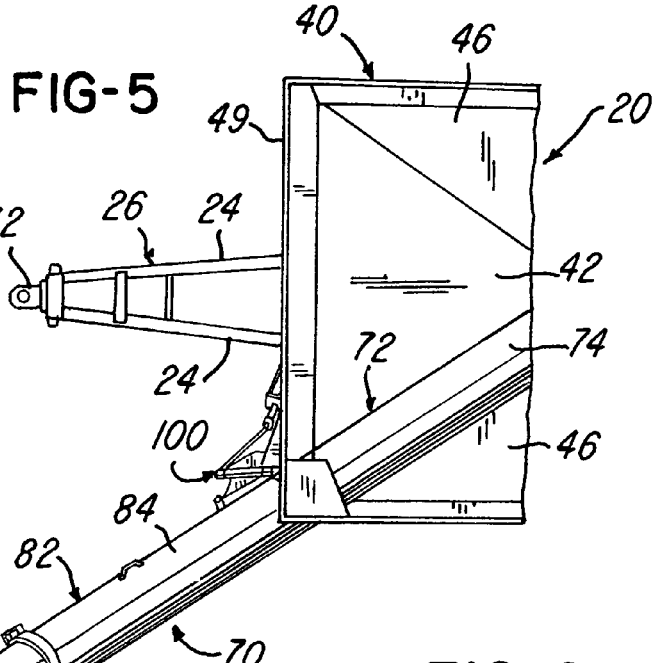
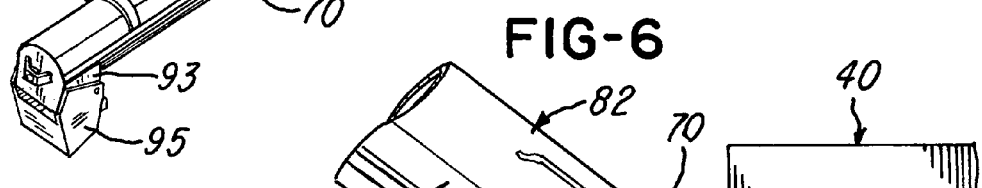
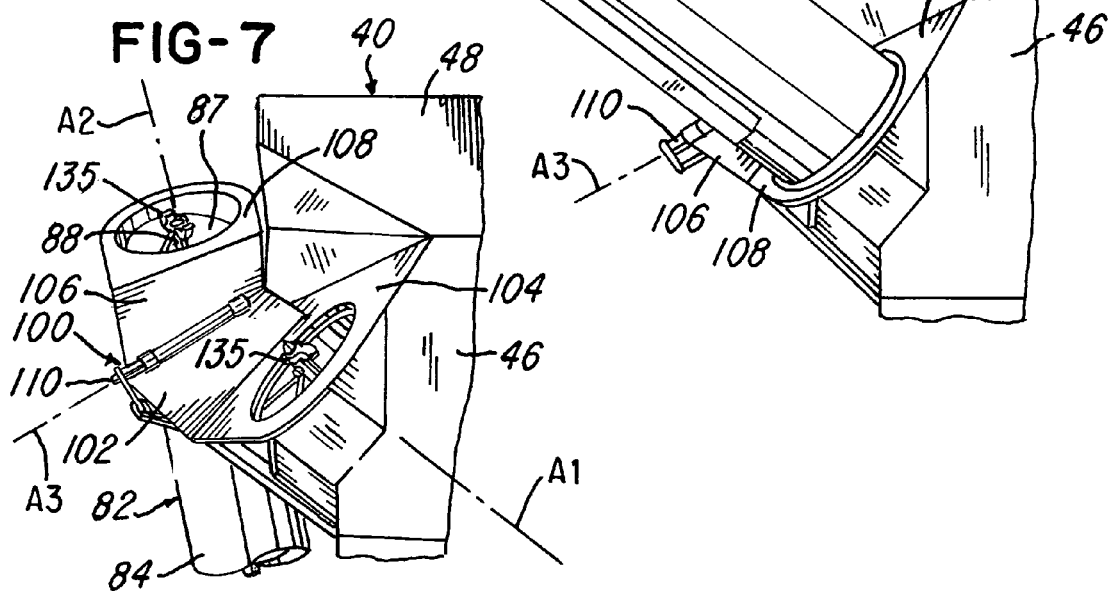

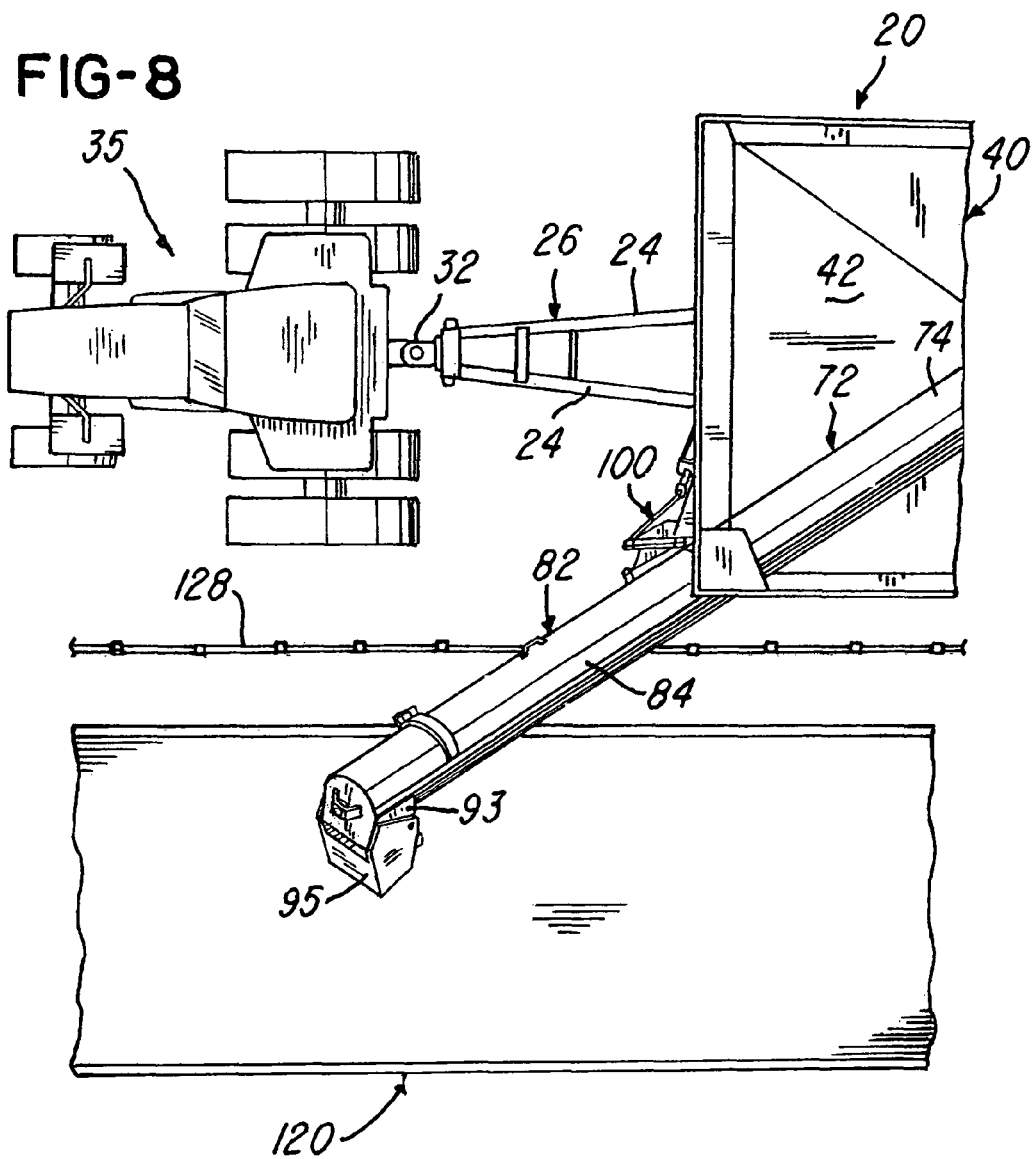

GRAIN CART HAVING A SINGLE AUGER DISCHARGE CONVEYOR

BACKGROUND OF THE INVENTION

The present invention relates to a grain wagon or cart of the type disclosed in U.S. Pat. No. 5,340,265, U.S. Pat. No. 6,296,435 and U.S. Pat. No. 7,134,830 which issued to the assignee of the present invention and which are commonly pulled by a tow tractor for transporting grain from a harvesting combine in a field to an open top semi-trailer which transports the grain over the road to a grain elevator for storage. In such a grain cart, the power driven single auger grain unloading conveyor includes an inclined lower auger conveyor section which extends adjacent an inclined front left corner portion of the container and an upper auger conveyor section which projects upwardly, laterally outwardly and forwardly from the container in a grain discharge position so that the discharging of the grain can be conveniently viewed by the operator or driver of the tow tractor. The upper auger conveyor section is pivoted by a fluid cylinder to a stored position adjacent the front wall of the container, as shown in the above-mentioned '281 patent and also in U.S. Pat. No. 5,655,872. This front folding upper auger conveyor section also enables the driver of the tow tractor to view all movements of the upper conveyor section between its stored position and its grain discharge position.

It has been found desirable to construct a grain cart with a single discharge auger conveyor and a bin or container having a larger grain capacity, for example, a capacity of over thirteen hundred bushels. It is also desirable to have the larger capacity container without using a dual auger system, such as disclosed in U.S. Pat. No. 4,846,621 and U.S. Pat. No. 6,776,569 and used in a grain cart manufactured and sold under the trademark "Brent". The dual auger system involves significantly more construction, assembly and manufacturing costs and significantly more maintenance costs. Above-mentioned U.S. Pat. No. 7,134,830 discloses a larger capacity grain cart with a single discharge auger conveyor and wherein the grain container has the optimum width of approximately twelve feet so that the grain cart may be transported or delivered over the road on the bed of a truck or trailer without requiring an escort permit.

It is further desirable for the upper section of the single auger conveyor to project upwardly, laterally outwardly and forwardly of the container in the grain discharge position by an extended distance for the reasons mentioned above and in order for the grain cart to unload into a semi-trailer which may be positioned further away from the grain cart, for example, on a road bed or on the other side of a ditch or fence. One method of extending the upper portion of the auger conveyor is to provide the tubular auger housing with a telescopic outer housing extension operated by a fluid cylinder, for example, as disclosed in U.S. Pat. No. 6,497,546 which issued to the assignee of the present invention. However, such a housing extension adds to the cost of manufacturing and maintenance of the auger conveyor, and it is desirable to avoid the loss of grain from between the telescopic housing sections.

SUMMARY OF THE INVENTION

The present invention is directed to a grain wagon or cart of the type disclosed in the above-mentioned patents issued to the assignee of the present invention and which provides all of the desirable features and advantages mentioned above. In accordance with the illustrated embodiment of the invention, a grain cart includes an open top container having inclined bottom walls and secured to a frame supported by a set of wheels, and with the frame having a front hitch adapted to be pivotally connected to a tow tractor. An elongated single auger conveyor includes an inclined lower conveyor section mounted on the container adjacent an inclined front bottom wall of the container and an extended upper auger conveyor section. Each of the conveyor sections includes a power driven auger having a helical flight and rotatable on an axis within a tubular housing.

The extended upper auger conveyor section has a grain discharge outlet portion and is supported by a hinge assembly adjacent a front corner portion of the container. The hinge assembly provides for pivoting the upper conveyor section on an axis extending offset and askewed at an acute angle relative to the axis of the auger in each conveyor section. The hinge assembly enables the extended upper conveyor section to pivot between a grain discharge position projecting upwardly, laterally outwardly and forwardly from the container and a retracted stored position projecting downwardly from the hinge assembly in front of the front wall of the container at a substantial angle relative to a horizontal plane. In the stored position, the discharge outlet portion of the upper conveyor section does not project beyond a vertical plane extending adjacent the right side wall of the container and is preferably located below the top surfaces of the wheels supporting the cart.

Other features and advantages of the invention will be apparent from the following description, the accompanying drawings and the appended claims.

BRIEF DESCRIPTION OF THE DRAWINGS

FIG. 1 is a perspective view of a grain cart constructed in accordance with the invention and showing the extended upper auger conveyor section in its stored position;

FIG. 2 is a top plan view of the grain cart shown in FIG. 1;

FIG. 3 is a front end view of the grain cart shown in FIGS. 1 and 2;

FIG. 4 is a front end view similar to FIG. 3 and showing the upper auger conveyor section in its grain discharge position relative to a grain receiving semi-trailer;

FIG. 5 is a fragmentary plan view of the front portion of the grain cart shown in FIG. 4;

FIG. 6 is a fragmentary perspective view of the upper auger conveyor section in its grain discharge position;

FIG. 7 is a fragmentary perspective view similar to FIG. 6 and showing the hinge assembly or structure in the position with the upper auger conveyor section in its stored position; and FIG. 8 is a fragmentary plan view of the grain cart shown in FIGS. 4 and 5 and its position relative to a tow tractor and grain receiving semi-trailer.

DETAILED DESCRIPTION OF THE ILLUSTRATED EMBODIMENT

FIG. 1 illustrates a grain wagon or cart 20 which has a general construction similar to the grain cart disclosed in above-mentioned U.S. Pat. No. 7,134,830, the disclosure of which is herein incorporated by reference. The grain cart 20 has a fabricated steel frame 22 formed by longitudinally extending tubular steel frame members 24 rigidly connected by cross tubular steel frame members and which converge at the front of the cart to form a tongue 26 having a hitch 32. The hitch is pivotally connected to a tow vehicle such as the farm tractor 35 shown in FIG. 8. A fabricated sheet metal grain hopper or container 40 includes an inclined front wall 42 and an inclined rear wall 44 which are rigidly connected by inclined opposite side walls 46.

Vertical top extension panels or walls 47, 48 and 49 project upwardly from the inclined side, front and rear walls and form a rectangular top opening for a grain receiving chamber 50 defined by the container 40. A set of opposing fabricated sheet metal wheel well covers 52 project inwardly from the side walls 46, and generally triangular or trapezoid-shaped grain diverter walls 56 connect the wheel well covers 52 to the side walls 46 and the rear wall 44. The rectangular container 40 is constructed similar to the rectangular container disclosed in above-mentioned U.S. Pat. No. 7,134,830.

As shown in FIGS. 3 and 4, an axle 62 is rigidly secured to the frame 22 and receives a set of extra wide rubber tire wheels 65 which project into the wheel wells define by the covers 52. Preferably, the container 40 has an overall width defined by the vertical side panels or walls 47 and 48 slightly under twelve feet or about 142 inches. As shown in FIG. 4, the wheels 65 project somewhat outwardly from corresponding vertical planes 67 defined by or adjacent the vertical side walls 47 and 48. However, when it is desired to ship or transport the grain cart 20 over the road on the bed of a trailer or truck, the wheels 65 may be removed so that the overall width of the grain cart 20 does not exceed twelve feet.

The grain cart 20 includes an inclined single auger-type grain unloading or discharge conveyor 70 which includes a lower conveyor section 72 formed by a tubular or cylindrical sheet metal housing 74 and enclosing an auger 76 having a helical flight 77 welded to a shaft 78. The lower end portion of the auger 76 projects from the housing 74 into a sump 81 which receives grain from the chamber 50 and forms an inlet for the conveyor 70. As shown in FIG. 2, the inclined lower section 72 of the conveyor 70 extends along or adjacent an inclined front left corner portion of the container 40. The auger conveyor 70 also includes an upper auger conveyor section 82 also formed by a tubular or cylindrical sheet metal housing 84 enclosing an auger 86 formed by a helical flight 87 welded to a shaft 88. The housing 84 has an outer end portion with a grain discharge outlet formed by a discharge spout 93 secured to the housing 84 and supporting a pivotal grain discharge spout 95 controlled from the tow vehicle, as disclosed in U.S. Pat. No. 6,296,435, the disclosure of which is herein incorporated by reference.

In accordance with the present invention, the lower conveyor section 72 and the upper conveyor section 82 are pivotally connected by a hinge structure or assembly 100 (FIG. 7) which includes a trapezoid-shaped hinge plate 102 welded at an obtuse angle to an end plate 104 secured to the end of the housing 74 and perpendicular to the axis A1 of the rotatable auger 76. The hinge assembly 100 also includes a second trapezoid-shaped hinge plate 106 which is welded at an obtuse angle to an end plate 108 welded to the end of the housing 84 and perpendicular or normal to the axis A2 of the auger 86 within the housing 84. The hinge plates 102 and 106 are pivotally connected by a hinge pin 110 which has a pivot axis A3 offset and askewed at an acute angle relative to reference planes perpendicular to each of the axes A1 and A2 or extending at an acute angle of about fourteen degrees relative to each of the end plates 104 and 108.

The hinge assembly 100 provides for pivoting the upper conveyor section 82 between a grain discharge position (FIGS. 4, 5, 6 and 8) where the upper conveyor section 82 projects upwardly, forwardly and laterally outwardly from the container 40 and a stored position (FIGS. 1, 2, 3 and 7) where the upper conveyor section 82 extends downwardly from the hinge assembly at a substantial angle A (FIG. 3) from a horizontal plane P. The angle A is greater than 25 degrees, and preferably at least 35 degrees. The upper conveyor section 82 is moved between the grain discharge position and the stored position by a fluid or hydraulic cylinder 115 (FIGS. 3 and 4) pivotally connected to a bracket 116 secured to the frame 22 and having a piston rod 118 pivotally connected to the housing 84 of the upper conveyor section 82. The operation or actuation of the cylinder 115 is controlled by the driver of the tow tractor 35, as described in above-mentioned U.S. Pat. No. 5,340,265.

As shown in FIGS. 4 and 8, when the upper conveyor section 82 of the grain unloading conveyor 70 is in the grain discharge position, the extended upper conveyor section 82 is able to discharge grain into a semi-trailer 120 which may be located on a road bed 122 and spaced a substantial distance from the grain cart 20. Sometimes the road bed 122 is elevated from the ground G of a field and may be on the opposite side of a ditch 124 (FIG. 4) or a fence 128 (FIG. 8). As shown in FIGS. 3 & 4, when the upper conveyor section 82 is in its downwardly extending stored position, the housing 84 seats on a cradle or support 130 which is connected to the frame 22 by a bracket 132. In the stored position, the outlet of the discharge spout 93 is located below the top surfaces of the wheels 65 and does not extend horizontally beyond the vertical plane 67 contacting the right side wall 47 of the container 40.

The pivotal discharge spout 95 may be removed from the housing 84 when the wheels are removed from the axle 62 for shipping or transporting the grain cart 20 on the bed of a trailer or truck. As shown in FIG. 2, when the upper conveyor section 82 is in its stored position, the section 82 extends slightly rearwardly under the front vertical wall 49 and the upper portion of the inclined front wall 42. When the upper conveyor section 82 is pivoted by the cylinder 115 to its grain discharge position (FIGS. 5 & 6), the hinge assembly 100 provides for the axis A2 to be substantially aligned with the axis A1 so that shaft coupling components 135 (FIG. 7) connect the shaft 88 of the auger 86 to the shaft 78 of the auger 76. Thus the gear box (not shown) under the sump 81 and driven by a hydraulic motor or power take off for rotating the shaft 78 also rotates the shaft 88 of the auger 86 in the upper conveyor section 82.

From the drawings and the above description, it is apparent that a grain wagon or cart constructed in accordance with the present invention, provides desirable features and advantages to the user of the grain cart. For example, by constructing the hinge assembly 100 as described above, the upper auger conveyor section 82 may be extended axially by over two feet, and this extension provides a significant and desirable increase in the length of the upper conveyor section in order to accommodate a higher semi-trailer 120 and/or a semi-trailer required to be spaced further from the grain cart. The hinge assembly 100 further provides the desirable feature of locating the upper conveyor section 82 in a stored position extending downwardly at a substantial angle, as shown in FIG. 3, whereby the outer end of the cylindrical housing 84 of the upper conveyor section does not project laterally outwardly beyond the vertical plane 67 defined by the right side wall 47. In addition, the hinge assembly 100 maintains the upper conveyor section 82 in front of the container 40 at all times during pivoting of the conveyor section between its stored position and its grain discharge position. This permits the driver of the tow tractor to observe all movements of the upper conveyor section 82 and insures that it does not interfere during folding with telephone lines or other obstacles close to the grain cart.

While the form of grain cart herein described constitutes a preferred embodiment of the invention, it is to be understood that the invention is not limited to this precise form of grain cart, and that changes made therein without departing from the scope and spirit of the invention as defined in the appended claims.

What is claimed is:

1. A grain cart adapted to be pulled by a tow tractor for transferring grain from a combine in a field to an open-top semi-trailer, said cart comprising
   a frame supported by a set of wheels and having a front hitch adapted to be pivotally connected to the tractor,
   a container supported by the said frame for receiving a volume of grain and having an inclined front wall portion, a left side wall and a right side wall,
   said grain cart having only a single auger conveyor including an inclined lower conveyor section and an upper conveyor section having an outer end portion with a grain discharge spout,
   each said conveyor section including a power driven auger having a helical flight and rotatable on an axis within a tubular auger housing,
   said inclined lower conveyor section extending within said container adjacent said inclined front wall portion and having an inlet positioned to receive grain from said container,
   said upper conveyor section supported by a hinge assembly adjacent a front left corner portion of said container for folding movement on a pivot pin between a retracted stored position and an inclined grain discharge position projecting upwardly, laterally outwardly and forwardly from said container,
   said upper conveyor section including said outer end portion with said grain discharge spout having a combined length causing said outer end portion with said discharge spout to extend beyond said right side wall of said container when said upper conveyor section moves on said pivot pin between said discharge position and said storage position,
   said hinge assembly connecting said upper conveyor section to said lower conveyor section and providing for pivoting said upper conveyor section on said pivot pin having a pivot axis extending offset and askewed at an acute angle relative to a plane perpendicular to said axis of said auger in said lower conveyor section and also offset and askewed at an acute angle relative to a plane perpendicular to said axis of said auger in said upper conveyor section,
   a hydraulic cylinder connected to move said upper conveyor section between said stored position and said grain discharge position,
   said upper conveyor section of said single auger conveyor in said stored position extending downwardly forward of said inclined front wall portion and at a substantial angle greater than thirty five degrees relative to a horizontal reference plane, and
   said outer end portion with grain discharge spout of said upper conveyor section in said stored position being located below upper surfaces of said wheels and adjacent a vertical reference plane contacting said right side wall of said container.

2. A grain cart as defined in claim 1 wherein said hinge assembly includes a first hinge member rigidly connected to said housing of said lower conveyor section, a second hinge member rigidly connected to said housing of said upper conveyor section, and said hinge pin pivotally connects said first hinge member to said second hinge member and provides for pivoting said upper conveyor section on said pivot axis between said stored position and said grain discharge position.

3. A grain cart as defined in claim 1 wherein said upper conveyor section of said single auger conveyor in said stored position extends downwardly from said hinge assembly above and generally parallel to said hydraulic cylinder connecting said frame to said upper conveyor section.

* * * * *